2,720,498

POLYTETRAFLUOROETHYLENE PLASTICIZED WITH CHLOROFLUORO TELOMERS

Anthony Francis Benning, Woodstown, N. J., and Frederick Burns Hill, Jr., Llangollen Estates, Del., assignors to E. I. du Pont de Nemours & Company, Wilmington, Del., a corporation of Delaware No Drawing. Application January 26, 1952,
Serial No. 268,464

2 Claims. (Cl. 260—33.8)

This invention relates to new polytetrafluoroethylene compositions and processes for making same. More specifically the invention relates to polytetrafluoroethylene compositions containing as a plasticizer therefor a chlorofluoro telomer.

Polymerized tetrafluoroethylene and the method for preparing it are disclosed in U. S. Patent 2,230,654. This polymer is inert to most chemical reagents and is insoluble in all known solvents. Because of its inertness to solvents and other chemicals as well as to heat, polymerized tetrafluoroethylene is a very valuable material. However, due to its toughness, inflexibility, and low plasticity even at high temperatures the usual methods for molding and extruding plastic materials are impractical or uneconomical. Therefore, special techniques are required for shaping this polymer into even very simple forms.

Representative of the special methods for molding polymerized tetrafluoroethylene is that disclosed in U. S. Patent 2,400,099. Even by this special method it can be molded only into simple shapes, such as sheets, strips, and rods. More complicated forms require machinery which is time consuming and wasteful of polymer. Therefore, it is desirable to plasticize polymerized tetrafluoroethylene prior to molding or extruding. This can be done by heating the polymer with substantially completely fluorinated hydrocarbon oils as described in U. S. Patent 2,510,078, but the present invention provides even softer moldings. As pointed out in the latter patent, although perfluorocarbon oils plasticize polytetrafluoroethylene, they are relatively ineffective for polychlorotrifluoroethylene which absorbs reasonably large amounts of perfluorocarbon oils fairly rapidly, with higher temperatures increasing the rate of absorption. However, the products differ from polytetrafluoroethylene plasticized by these same oils in being hard and non-pliable at room temperature. Hence, one cannot predict what materials will plasticize one of these polymers from those which plasticize the other.

It is therefore an object of this invention to provide new polytetrafluoroethylene compositions which may be more readily shaped than previously known compositions based on this polymer. It is another object of this invention to provide new polytetrafluoroethylene compositions containing effective plasticizers. A further object is to provide a process for making new plasticized polytetrafluoroethylene compositions. Another object is to provide an improved process for bonding polytetrafluoroethylene to itself. Other objects will appear from the description of the invention given below.

The above objects are accomplished by providing a plastic composition consisting essentially of a mixture of from 91% to about 60% by weight of polymerized tetrafluoroethylene, which normally fails to soften at temperatures below 327° C., and from 9% to about 40% by weight of a plasticizer of the class consisting of reaction products of chloroform with a member of the group consisting of chlorotrifluoroethylene and mixture of chlorofluoroethylene with tetrafluoroethylene in which the tetrafluoroethylene is present in a proportion of up to about 30% by weight, based on the combined weights of said two fluoroethylenes, and such reaction products in which the hydrogen and from 1 to 3 chlorine atoms have been replaced by fluorine; which plasticizer boils at a temperature of at least 100° C. under a pressure of 1 m. of Hg, has an average chain length of from about 25 to about 35 carbon atoms, and contains from about 20% to about 41% by weight of chlorine.

The preferred proportion of plasticizer is 20–25% by weight based on the total plasticized polytetrafluoroethylene composition. These plasticizers vary in consistency from oils to greases and have an average molecular weight of from about 1200 to about 2000. Since they are reaction products formed between a polymerizing monomer and a nonpolymerizable compound (in this case chloroform), these plasticizers comprise one of the types of products, referred to in this art as "telomers," by which name they will often be referred to in this specification. Smaller amounts of plasticizer below 9% do not plasticize polytetrafluoroethylene satisfactorily for molding and extruding. Although amounts greater than 40% may be incorporated into the polymer, the products are too soft to withstand the temperatures and pressures to which discs and such shaped objects are normally subjected for fabrication of articles from polytetrafluoroethylene. Furthermore, in some cases it is difficult to retain these larger amounts of plasticizer because of volatility losses.

It should be borne in mind that the telomer plasticizer content of the plasticized polytetrafluoroethylene compositions of this invention is reduced substantially by volatilization of the telomer grease or oil at 340–360° C. These telomer losses are approximately 10%–50% of the original telomer, being in the upper portion of this range for crude telomers. The unstabilized telomers are not necessarily more volatile than those remaining after the stabilizing treatment, but they are believed to be much more unstable to heat. Thus, although the molding conditions nearly eliminate loss of stabilized telomer, they cannot prevent substantial loss of unstabilized telomer.

Either stabilized or unstabilized telomers may be used in the practice of this invention. As explained herein, a stabilized telomer is one which has been heated to an elevated temperature in the presence of $CoF_3$ with agitation until the labile hydrogen and chlorine atoms (assumed to be one terminal H atom and three terminal Cl atoms) in the telomer have been replaced with fluorine atoms. The completion of this fluorination reaction was determined by the color change of the mass, which is caused by a change from $CoF_3$ to $CoF_2$ (brown to pink). The desired degree of thermal and chemical stability in the telomer determines the extent to which the crude telomer must be treated. For the purposes of this invention a satisfactorily stabilized telomer is obtained according to the procedure given below, where no further reaction occurs after two hours at 180–220° C.

The amount of chlorine in the telomer, which may vary from 20–41% by weight, is indicative of the extent to which the crude telomer has been stabilized by treatment with $CoF_3$. Thus, the lower range of chlorine content applies to the stabilized telomers whereas the upper range of 41% chlorine applies to the unstabilized telomers. Of course, the larger the amount of tetrafluoroethylene used in making the telomer, the lower the chlorine content of the crude telomer. The amount of chlorine in each telomer is actually determined by gravimetric analysis, and the molecular weight calculated from the chlorine content, assuming that the stabilized telomers contain one Cl atom for every two C atoms (the remainder being F atoms), and the crude unstabilized telomers contain three additional Cl atoms and one H atom per telomer molecule. For both stabilized and unstabilized telomers it is assumed that the ratio of tetrafluoroethylene to chlorotrifluoroethylene is the same in the telomer as in the mixture of monomers. The telomers may be fractionally distilled and used as narrow cuts, or they may be used as crude telomer mixtures of different molecular weights, which are less expensive; or, of course, several different purified telomers may be blended before use. In each of these three forms, however, the telomers are of substantially equivalent plasticizing value when mixed as indicated with powdered polytetrafluoroethylene.

When a telomer is made from a mixture of chlorotrifluoroethylene and tetrafluoroethylene, the tetrafluoroethylene content in the telomer should not exceed about 30% by weight based on the combined weights of the two fluoroethylenes, because larger amounts of tetrafluoroethylene in the telomer produce waxy or solid products which are not as satisfactory as plasticizers for polytetrafluoroethylene.

The chlorofluoro telomers used in the practice of this invention may be prepared, in general, by heating chlorotrifluoroethylene or a mixture of chlorotrifluoroethylene and tetrafluoroethylene (said mixture containing up to 30% by weight of tetrafluoroethylene) in excess chloroform solution (5%–20% by weight total fluoroethylene concentration) containing 5%–10%, by weight of the total fluoroethylene, of a peroxy catalyst, according to the method described by Miller et al., Ind. and Eng. Chem., 39, 333 (1947). Suitable peroxy catalysts include benzoyl peroxide, acetyl peroxide and chloracetyl peroxide. The reactants are heated to a temperature sufficient to activate the particular catalyst used, which for benzoyl peroxide catalyst may be in the range of 70° C.–150° C. The reaction is continued until the drop in pressure levels off. A typical example of the preparation of a suitable chlorofluoro telomer involved the polymerization of 80 parts of chlorotrifluoroethylene and 20 parts of tetrofluoroethylene in 900 parts of chloroform at 100° C. using 5 parts of benzoyl peroxide catalyst. This reaction produced 85 parts of chlorofluorotelomer grease which has an average molecular weight in the range of 1200–2000.

A typical example of stabilizing a chlorofluoro telomer, following the general procedure described by Miller et al. (ibid.), involved heating the above telomer grease with slow agitation in a stainless steel, nickel or other corrosion-resistant vessel to a temperature of 135° C., at which point the first addition of CoF$_3$ was made. CoF$_3$ was added in small portions over a period of 3.5 hours. The total amount of CoF$_3$ added was equal to the weight of the crude telomer to be stabilized, and the extent of heating was determined by color change of the mass during fluorination, the end of the stabilization treatment being achieved when the color had changed from brown to pink (caused by change from CoF$_3$ to CoF$_2$). The temperature was held at 200° C.±20° C. for two hours after the last addition, then the batch was cooled, extracted with 1,1,2-trichloro-1,2,2-trifluoroethane and filtered. Evaporation of this solvent from the extract gave an 83% yield of stabilized chlorofluoro telomer.

The chlorofluoro telomer plasticizers may be incorporated into the tetrafluoroethylene polymer by either of two methods: (1) by a simple dipping of the massive polymer (sheets, strips, rods, etc.) into liquid chlorofluoro telomer maintained at 300° C.–360° C. for ½ to 1 hour; or (2) by mixing a solution of the telomer plasticizer in a suitable solvent with the polymer molding powder or finely divided polymer. The polytetrafluoroethylene used may be either the white granular powder resulting from the polymerization of tetrafluoroethylene by well-known procedures such as that described in U. S. P. 2,393,967, or may be the finely divided colloidal particles of polytetrafluoroethylene resulting from coagulation and drying of an aqueous colloidal dispersion of polytetrafluoroethylene, which in turn may be prepared by procedures such as described in U. S. Patents 2,534,058 and 2,559,752. Suitable solvents which may be employed in working with these telomer plasticizers include 1,1,2-trichloro-1,2,2-trifluoroethane, carbon tetrachloride, and other organic solvents in which the telomers are at least moderately soluble. Evaporation of the solvent leaves the telomer evenly distributed throughout the molding powder and plasticization is completed by heating at 340–360° C. for 10–15 minutes at 500 lbs./sq. in. pressure. This combined heating and pressing procedure gives a satisfactory molding simultaneously.

The following two general procedures were employed in preparing specimens for testing each plasticized polytetrafluoroethylene composition to determine the extent of plasticization.

(1) The chlorofluoro telomer was dissolved in trifluorotrichloroethane as a solvent (about 10–25 parts of solvent for each part of telomer). This solution was mixed with the polytetrafluoroethylene molding powder, and the solvent was evaporated so that the particles of molding powder were coated and/or impregnated by the telomer plasticizer. The resulting powder was loaded into a plain disc mold of such dimensions that a disc of 2⅜ inch diameter with 5/16 inch thickness was produced. This mold required a loading of 45–50 grams of powdered polytetrafluoroethylene, and was held at 340–360° C. for 10–15 minutes under 500 lbs./sq. in. pressure. The plasticized discs were tested for flexibility by manual examination, and for hardness by use of a Shore "D" scale durometer, a well-known instrument for measuring the hardness of soft materials. This is done by measuring the penetration into the object being tested with a pin of a certain diameter at an arbitrary calibrated loading on a spring. Thus, the smaller the Shore hardness value, the softer the plasticized polytetrafluoroethylene.

(2) Flanged couplings of plasticized polytetrafluoroethylene were also prepared. They were short pipe-like pieces about 1 in. in diameter with a small flange at one end in a plane perpendicular to that of the tubular portion. These were prepared in a suitable mold under the same conditions of temperature and pressure used on the discs. These couplings were only ⅛ in. thick, and the effect of the plasticizer was even more strikingly observed than in the discs. Merely the pressure of the thumb and two fingers would bend these plasticized couplings, but not similarly-made unplasticized couplings. Furthermore, the plasticized couplings exhibited a smooth, uniform surface in contrast to the chipped, uneven surface of the unplasticized ones.

Another part of the present invention involves the use of the chlorofluoro telomer for bonding polytetrafluoroethylene to itself. Although polytetrafluoroethylene can be bonded to itself by heating under pressure, such bonding in the absence of an adhesive gives relatively weak and unsatisfactory adhesion. The present bonding procedure comprises applying the chlorofluoro telomer to the surface of polytetrafluoroethylene sheets or other objects, which are then joined and heated under pressure to form the bond. The chlorofluoro telomer may be used as such, but it is more convenient to handle as a paste made by flushing a polytetrafluoroethylene dispersion into it. (See Example III.) The telomer or telomer/polytetrafluoroethylene paste may be applied by any convenient method such as brushing. A one minute heat treatment at approximately 200–500 lbs./sq. in. pressure gives satisfactory adhesion. Heat treatments of less than one minute are generally too short, whereas longer periods are unnecessary and would be harmful in that too much plasticizer would be lost by distillation from the polytetrafluoroethylene. Pressures lower than 200 lbs. per sq. in. require uneconomically long heating periods, whereas higher pressures than 500 lbs. per sq. in. are operable but unnecessary. The bonding strengths reported below were tested on a modified Schopper machine, which is an instrument for evaluating such adhesive bonds by pulling the members of the bonded article in opposite directions. The pull required to break the bond is indicated on a scale in pounds per linear inch.

The following examples are illustrative embodiments of the present invention. All parts throughout the specification are given by weight unless otherwise specified.

Example I

Polytetrafluoroethylene powder (80 parts) was treated with 20 parts of chlorofluoro telomer grease as a dilute solution in 1,2,2-trifluoroethane. The chlorofluoro telomer grease was made according to the above-described procedure from 80 parts by weight of chlorotrifluoroethylene and 20 parts by weight of tetrafluoroethylene. This grease had a chlorine content of 29.3% and an average molecular weight of 1800. After evaporation of the trichlorotrifluoroethane, the polymer contained 20 weight percent of telomer grease. A sample of this mixture was molded as described above (340–360° C. at 500 lbs./sq. in. for 10–15 min.), producing a disc containing 16 weight percent of grease. This disc had a Shore hardness of 50.

A similar treatment of polymer with 40 weight percent of the grease, giving 22 weight percent after molding, produced a Shore hardness of 43. This was softer than the value 45 obtained from polytetrafluoroethylene plasticized with 22 weight percent of perfluorocarbon oil used in U. S. Patent 2,510,078.

A Shore hardness of 40 resulted from use of 25 weight percent (20% after molding) of the same chlorofluoro telomer grease which had been stabilized by $CoF_3$ treatment, and fractionally distilled to produce a greasy cut having a chlorine content of 23.3% and an average molecular weight of 1200.

These results are considerably superior to the Shore hardness value 55 obtained from unplasticized polytetrafluoroethylene.

Example II

Flanged couplings of plasticized polytetrafluoroethylene were prepared from the above-described crude and stabilized $CHCl_3$-telomer grease ($CClF=CF_2:CF_2=CF_2$ weight ratio 80:20) under the same temperature and pressure conditions for molding as used in Example I. Relatively soft couplings were produced from plasticized polymer containing 13 and 20 weight percent of unstabilized telomer grease and of a stabilized telomer grease, respectively. These couplings could be bent easily, as by the pressure of the fingers, whereas unplasticized controls were hard and stiff.

Example III

A 30 g. sample of a 50% polytetrafluoroethylene aqueous dispersion was flushed into 50 g. of chlorofluoro telomer, made from 80% chlorotrifluoroethylene and 20% tetrafluoroethylene in chloroform, by stirring at 50° C. in the presence of acetone. The volume of acetone used was approximately equal to the volume of the aqueous dispersion. Vigorous stirring of this mixture transferred the polymer to the grease phase to form a smooth white sticky paste, which was separated from the aqueous phase.

This paste was brushed in a thin, even layer on to sheets of polytetrafluoroethylene, which were subjected to a heat treatment of 340° C. at 500 lbs. per sq. in. pressure for one minute. The resulting bond had an average strength of 30 lbs. per linear inch as compared with 12 lbs. per linear inch for two pieces of polytetrafluoroethylene sheeting bonded at 350° C. without the adhesive paste.

Example IV

Another bond was made from a similar adhesive using the same procedure as given in Example III, but containing a $CHCl_3$ telomer grease of chlorotrifluoroethylene/tetrafluoroethylene in the weight ratio of 70/30. In this case the average strength for sheets of ¼″, ⅜″, and ½″ was 26 lbs., as contrasted to 12 lbs. for the above mentioned control.

Example V

A chlorofluoro telomer was prepared by polymerizing chlorotrifluoroethylene monomer in excess chloroform solution under the same conditions as described in Example I. The resulting telomer was stabilized by $CoF_3$ treatment as described elsewhere in the specification to give a product from which was separated an oil having a boiling point of 100–220° C. at 1 mm. of Hg and a chlorine content of 29.5%. 25 parts of this stabilized telomer oil were incorporated into 75 parts of granular powdered polytetrafluoroethylene by method (2) described herein; i. e. by mixing a solution of the telomer in trichlorotrifluoroethane with the powdered polymer, followed by evaporation of the solvent. After molding this plasticized polymer into a disc at 340–350° C. for 12 minutes at 500 lbs./sq. in. pressure, the telomer content had dropped from 25% to 16% by weight. The Shore hardness of this molded sample was 38 compared with 55 for unplasticized polytetrafluoroethylene.

The plasticized polytetrafluoroethylene compositions of this invention permit the preparation of shaped articles possessing even greater softness and flexibility than unplasticized polytetrafluoroethylene moldings and extruded objects. Furthermore, the stabilized telomers are considerably more effective than the perfluorocarbon oils of U. S. P. 2,510,078 for softening polytetrafluoroethylene, and the unstabilized telomers are slightly more effective. The amount of hydrogen in the crude chlorofluoro telomers is so small that it has a negligible effect on the chemical resistance of the plasticized polymer article. In the stabilized telomers essentially all hydrogen has been replaced by fluorine. The use of the chlorofluoro telomers, particularly in combination with finely divided polytetrafluoroethylene, as adhesives for joining polytetrafluoroethylene to itself leads to substantially stronger bonds which cannot be obtained by heat-sealing this polymer alone. Another advantage of this invention is that the chlorofluoro telomers do not discolor polytetrafluoroethylene seriously, particularly if the telomers have been pretreated with $CoF_3$.

We claim:

1. A plastic composition consisting essentially of a mixture of from 91% to about 60% by weight of polytetrafluoroethylene, which normally fails to soften at temperatures below 327° C., and from 9% to about 40% by weight of a plasticizer which is a member of the group consisting of (1) telomers of chloroform with chlorotrifluoroethylene, (2) telomers of chloroform with chlorotrifluoroethylene-tetrafluoroethylene mixtures in which the tetrafluoroethylene content does not exceed 30% by weight based on the combined weights of said two fluoroethylenes, (3) and compositions which differ from the aforesaid telomers in having hydrogen and from 1 to 3 chlorine atoms replaced by fluorine, which plasticizer boils at a temperature of at least 100° C. under a pressure of 1 mm. of Hg, has an average chain length of from about 25 to about 35 carbon atoms, and contains from about 20% to about 41% by weight of chlorine.

2. A plastic composition consisting essentially of a mixture of from 91% to about 60% by weight of polytetrafluoroethylene, which normally fails to soften at temperatures below 327° C., and from 9% to about 40% by weight of a reaction product of chloroform with a mixture of chlorotrifluoroethylene with tetrafluoroethylene in which the tetrafluoroethylene is present in a proportion from 20% to 30% by weight, based on the combined weights of said two fluoroethylenes, which reaction product boils at a temperature of at least 100° C. under a pressure of 1 mm. of Hg, has an average chain length of from about 25 to about 35 carbon atoms, and contains from about 20% to about 41% by weight of chlorine.

References Cited in the file of this patent
UNITED STATES PATENTS 2,600,802     Passino _____ July 17, 1952